United States Patent [19]
Onodera

[11] Patent Number: 5,446,324
[45] Date of Patent: Aug. 29, 1995

[54] COATING MATERIAL FOR AN ARMATURE COIL OF AN ELECTRICAL MOTOR

[75] Inventor: Tsugio Onodera, Sawa, Japan

[73] Assignee: Mitsuba Electric Manufacturing Co. Ltd., Gunma, Japan

[21] Appl. No.: 63,036

[22] Filed: May 18, 1993

[30] Foreign Application Priority Data

May 18, 1992 [JP] Japan .................. 4-149980

[51] Int. Cl.$^6$ ............................ H02K 15/12
[52] U.S. Cl. ...................... 310/45; 336/205; 427/116
[58] Field of Search ............ 310/45; 336/205, 209, 336/219; 427/104, 116, 117

[56] References Cited

U.S. PATENT DOCUMENTS

| | | | |
|---|---|---|---|
| 2,846,599 | 5/1958 | McAdam | 310/43 |
| 3,646,374 | 2/1972 | Jordan et al. | 310/45 |
| 4,710,662 | 12/1987 | Balke et al. | 310/204 |
| 4,898,328 | 2/1990 | Fox et al. | 239/6 |
| 4,922,604 | 5/1990 | Marshall et al. | 29/598 |
| 5,083,366 | 1/1992 | Arakawa et al. | 29/605 |
| 5,324,767 | 6/1994 | Koyama et al. | 524/493 |

FOREIGN PATENT DOCUMENTS

| | | |
|---|---|---|
| 93303778 | 8/1993 | European Pat. Off. . |
| 62-224009 | 10/1987 | Japan . |
| 2220945 | 1/1990 | United Kingdom . |

*Primary Examiner*—Thomas M. Dougherty
*Assistant Examiner*—Judson H. Jones
*Attorney, Agent, or Firm*—Oliff & Berridge

[57] ABSTRACT

A composition for the copper armature coil of a electric motor which can withstand crack generation due to great temperature differentials by setting the coefficient of thermal expansion of the composition to a value between the coefficients of thermal expansion of both iron and copper.

7 Claims, 1 Drawing Sheet

COATING MATERIAL FOR AN ARMATURE COIL OF AN ELECTRICAL MOTOR

BACKGROUND OF THE INVENTION

1. Field of the Invention

Generally, the present invention relates to improving the reliability of motors used in electrical equipment in automobiles, i.e. a starter motor, a wiper motor, a power window motor, a power seat motor, a sunroof motor and the like. Specifically, the present invention relates to a composition that is impregnated on the armature coil of an electrical motor to improve the motor's reliability by withstanding the onset of cracks due to great differentials in temperature.

2. Description of the Related Art

In electrical motors, a copper armature coil is wound around a slot formed in an iron armature core. The copper armature coil is fixed to the iron armature core by a resin composition (fillers) impregnated in between the armature coils within the slot. The composition protects the armature coil, or projection thereof, from abrasions when the armature is rotating at high speeds. Without the resin composition, the armature coil or projection thereof may break, or an insulating film, which is commonly used, may peel off. Thus the composition is important in maintaining the reliability and life of an electrical motor.

When an electrical motor, such as a starter motor, is located near an automobile engine, it can be subjected to internal temperature differentials ranging from as high as 150° C. to as low as −40° C. or below. Such temperature differentials are common during cold weather conditions when an automobile engine has been running for a period time, and then turned off. Electrical motors that are continually subjected to great differentials in temperatures are unreliable and have short operating lives because the composition cracks. Until now, the need for an electrical motor that can withstand great temperature differentials has existed.

SUMMARY OF THE INVENTION

Through extensive research, the present inventors have studied this problem and have discovered that crack generation occurs because of the differences between the coefficient of thermal expansion of the composition and the coefficients of thermal expansion of both iron and copper.

An object of the present invention is to provide a composition which is capable of withstanding crack generation when subjected to great differentials in temperature.

In accordance with the above object, the present inventors have discovered that a resin composition, which has a coefficient of thermal expansion falling in between the coefficients of thermal expansion of copper and iron, respectively, is resistant to crack generation.

DESCRIPTION OF THE PREFERRED EMBODIMENT

Figure 1:
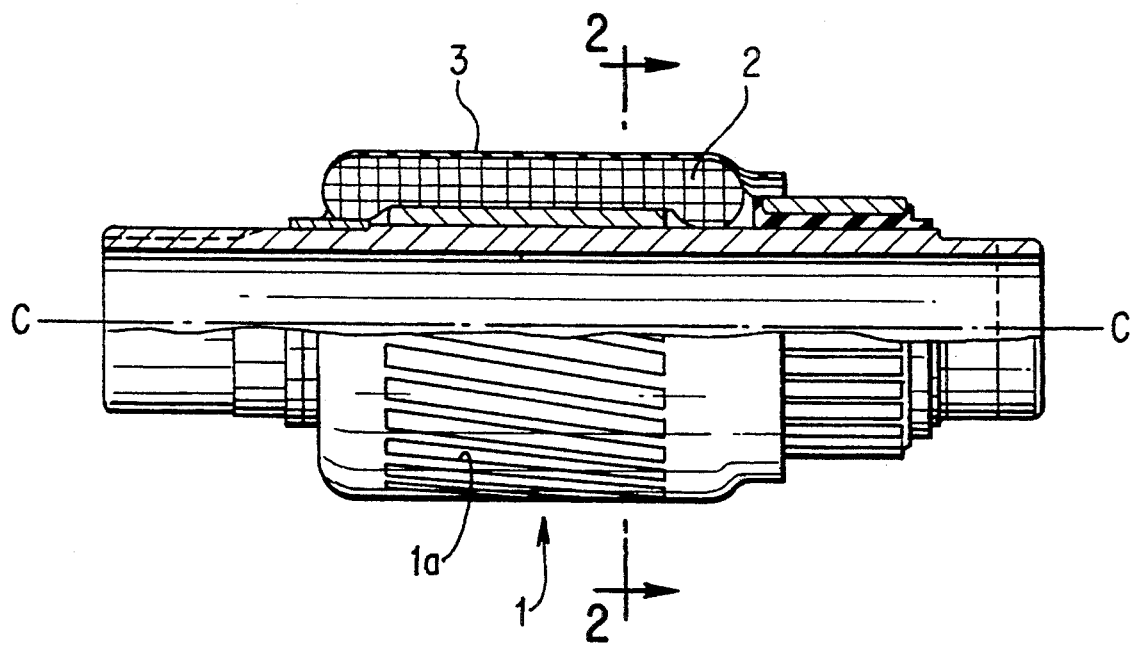
FIG. 1 is a front view of an armature core, with a portion broken away.

An embodiment of the present invention will be described below with reference to the accompanying drawing. In the figure, an armature core 1 constitutes a motor for electrical equipment. The armature core 1 comprises a plurality of thin platelike laminations of an iron core material. Copper armature coils 2 are wound around a slot 1a formed in the armature core 1. A resin composition 3 is impregnated in between armature coils 2 within the slot 1a with the armature coil 2 wound around to fix the armature coil 2 to the armature core 1.

Simulation tests were conducted to examine the relationship between the coefficient of thermal expansion and crack generation. First, the armature cores 1 were manufactured. Then, the armature cores 1 were impregnated with a composition 3 under substantially the same conditions and with substantially the same amount of compositions 3.

The compositions 3 used in the simulation test were diallyl phthalate impregnated with 70% glass fiber. Besides a diallyl phthalate resin, an unsaturated polyester resin or an epoxy resin can also be used as the main component of the composition. Such a resin is cross-linked (bridged) using styrene oligomer or allyl oligomer, to adjust the coefficient of thermal expansion thereof to a value between the coefficients of thermal expansion of iron and copper.

Each of the compositions had different coefficients of thermal expansion. The coefficient of thermal expansion for the compositions were each adjusted by the cross-linking of styrene oligomer. Four types of compositions were prepared, each respectively having coefficients of thermal expansion (which are coefficients of linear expansion) of $2.55 \times 10^{-5}$ (comparative example 1), $1.96 \times 10^{-5}$ (comparative example 2), $1.51 \times 10^{-5}$ (example 1) and $1.36 \times 10^{-5}$ (example 2). To account for variations in the tests, three composition samples were used in each test. The present inventors conducted the same experiments as the above-described experiments using such compositions, and obtained the same results.

Figure 2:
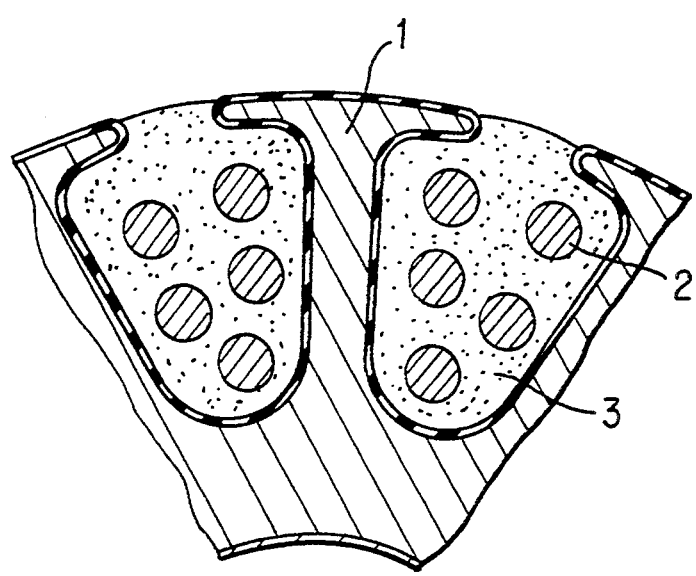
FIG. 2 is a B—B cross section of the armature core of FIG. 1.

Each of the manufactured armature cores 1 were then rotated at a speed of 2000 revolutions/min (rpm) while the temperature of the atmosphere thereof was raised from −50° C. to 200° C. in 10 minutes. At 200° C., the armature core 1 was rotated for another 20 minutes. After the rotation of the armature core 1 was stopped, the temperature of the atmosphere was cooled from 200° C. to −50° C. in 30 minutes, and was then maintained to −50° C. for 20 minutes. This procedure was repeated 20 times. Thereafter, the armature core 1 was removed to observe the composition 3 for any incidence of crack generation. Crack generation was evaluated by visually observing the sliced two surfaces of a coil end portion A of the armature core 1, the sliced two surfaces of a core portion B thereof (schematically illustrated in FIG. 2), and the two axially cut surfaces of an armature core portion C. Table 1 shows the results of the tests.

TABLE 1

| Sample | No. | Coefficient of Thermal Expansion ($\times 10^{-5}$) | Incidence of Crack Generation | | |
|---|---|---|---|---|---|
| | | | Portion A | Portion B | Portion C |
| Example 1 | 1 | 1.51 | None | None | Slightly Generated |
| | 2 | 1.51 | None | None | None |
| | 3 | 1.51 | Slightly Generated | None | None |
| Example 2 | 1 | 1.36 | None | None | None |
| | 2 | 1.36 | None | None | None |
| | 3 | 1.36 | None | None | None |

TABLE 1-continued

| Sample | No. | Coefficient of Thermal Expansion ($\times 10^{-5}$) | Incidence of Crack Generation | | |
|---|---|---|---|---|---|
| | | | Portion A | Portion B | Portion C |
| Comparative Example 1 | 1 | 2.55 | High Occurrence | High Occurrence | High Occurrence |
| | 2 | 2.55 | High Occurrence | Moderate Occurrence | High Occurrence |
| | 3 | 2.55 | Moderate Occurrence | High Occurrence | High Occurrence |
| Comparative Example 2 | 1 | 1.96 | High Occurrence | Slight Occurrence | Slight Occurrence |
| | 2 | 1.96 | Moderate Occurrence | Slight Occurrence | Moderate Occurrence |
| | 3 | 1.96 | Moderate Occurrence | Slight Occurrence | High Occurrence |

Table 1 shows that crack generation was observed more or less in Comparative Examples 1 and 2 in which the compositions 3 had a high coefficient of thermal expansion. No crack was generated at all or cracks were generated at an inconsequentially low level in Examples 1 and 2. The coefficient of thermal expansion of iron in the armature core 1 was about $1.15 \times 10^{-5}$. The coefficient of linear expansion of copper in the armature coil 2, ranged from $1.54 \times 10^{-5}$ to $1.62 \times 10^{-5}$. In Examples 1 and 2, in which substantially no cracks were generated, the coefficients of thermal expansion of composition 3 fell between the coefficients of thermal expansion of iron and copper—$1.51 \times 10^{-5}$ and $1.36 \times 10^{-5}$, respectively.

From the tests results, it was concluded that generation of cracks in the composition 3, due to temperature differentials, is greatly affected by the coefficient of thermal expansion of the respective materials. In an electrical motor subjected to great temperature differentials, crack generation can be effectively avoided by using the composition 3 which has a coefficient of thermal expansion between the coefficient of thermal expansion of iron and copper. Thus, the reliability of an electrical motor can be greatly improved.

What is claimed is:
1. An armature for an electrical motor comprising:
   an iron armature core;
   a copper armature coil wound about the iron armature core; and
   a resin composition impregnated on the armature core with the copper armature coil wound thereon to fix the armature coil to the armature core, the resin composition having a coefficient of thermal expansion chosen to be between the coefficients of thermal expansion for iron and copper.
2. A method for manufacturing an armature for an electrical motor comprising the steps of:
   fixing a copper armature coil to an iron armature core with a resin composition; and
   setting a coefficient of thermal expansion of the resin composition chosen to be between coefficients of thermal expansion for copper and iron.
3. The method of claim 2, wherein the step of setting the coefficient of thermal expansion of the resin includes the step of cross-linking (bridging) the resin composition with a cross-linking agent to adjust the coefficient of thermal expansion of the resin composition.
4. The method of claim 3, wherein the cross-linking agent is selected from the group comprising:
   styrene oligomer and allyl oligomer.
5. An armature according to claim 1, wherein said resin coating material prevents projection of said armature coil from said armature core due to centrifugal force generated when said armature core is rotating at high speeds.
6. An armature according to claim 1, wherein said resin coating material prevents cracking of said armature core after said armature core is repeatedly exposed to high temperature differentials and rotation at high speeds.
7. An armature according to claim 1, wherein said resin coating material is impregnated into said armature core and on a connecting portion of said armature coil, said connecting portion electrically connecting said armature coil to a commutator of said electrical motor.

* * * * *